(12) United States Patent
Baldwin

(10) Patent No.: US 6,834,748 B2
(45) Date of Patent: Dec. 28, 2004

(54) LININGLESS BRAKE ASSEMBLY WITH DAMPERS

(75) Inventor: Steven Baldwin, Troy, MI (US)

(73) Assignee: Meritor Heavy Vehicle Technology, LLC, Troy, MI (US)

( * ) Notice: Subject to any disclaimer, the term of this patent is extended or adjusted under 35 U.S.C. 154(b) by 0 days.

(21) Appl. No.: 09/921,239

(22) Filed: Aug. 2, 2001

(65) Prior Publication Data

US 2003/0024775 A1 Feb. 6, 2003

(51) Int. Cl.$^7$ .............................................. B61H 13/00
(52) U.S. Cl. ........................... 188/74; 188/85; 188/130
(58) Field of Search ................................. 188/296, 295, 188/302, 303, 304, 85, 152, 266, 283, 271, 290, 67, 74, 129, 130, 381; 92/58; 192/60; 303/1; 267/210, 205, 215

(56) References Cited

U.S. PATENT DOCUMENTS

| | | | | |
|---|---|---|---|---|
| 1,548,991 A | * | 8/1925 | Giovannini | |
| 1,658,960 A | * | 2/1928 | Adams | |
| 1,886,624 A | * | 11/1932 | Barton | |
| 2,001,585 A | * | 5/1935 | Roeder | |
| 2,035,387 A | * | 3/1936 | Heritier | |
| 2,395,355 A | * | 2/1946 | Thompson | |
| 2,640,563 A | * | 6/1953 | Sanders | |
| 2,807,335 A | * | 9/1957 | Beaumont et al. | |
| 2,861,656 A | * | 11/1958 | Grapt et al. | |
| 2,880,825 A | * | 4/1959 | Porter | |
| 3,033,322 A | * | 5/1962 | Hugher | |
| 3,073,418 A | * | 1/1963 | Bentley | |
| 3,393,582 A | * | 7/1968 | Mueller | |
| 3,393,583 A | * | 7/1968 | Mueller | |
| 4,518,069 A | * | 5/1985 | Elias | |
| 4,991,698 A | * | 2/1991 | Hanson | |
| 5,373,921 A | * | 12/1994 | Muscatell | |
| 5,465,817 A | * | 11/1995 | Muscatell | 188/295 |
| 6,357,571 B1 | * | 3/2002 | Schakel | 192/216 |

FOREIGN PATENT DOCUMENTS

| | | | |
|---|---|---|---|
| DE | 3720280 | * | 1/1988 |
| DE | 3726318 | * | 2/1989 |
| EP | 633178 A1 | * | 1/1995 |
| FR | 2245226 | * | 4/1975 |

* cited by examiner

Primary Examiner—Douglas C. Butler
(74) Attorney, Agent, or Firm—Carlson, Gaskey & Olds

(57) ABSTRACT

A vehicle brake assembly utilizes a damping mechanism to eliminate brake linings. The brake assembly includes a fixed base plate and an actuation plate rotatable relative to the base plate. The base plate includes a plurality of orientation slots and the actuation plate includes a plurality of actuation slots with each one of the actuation slots partially overlapping one of the orientation slots. A cam having a plurality of cam-lobes formed about the circumference is mounted for rotation with an axle shaft. A plurality of dampers interact with the cam to brake the vehicle. Each damper includes a mounting portion that extends through one of the orientation slots and the corresponding actuation slot, and which has a movable distal end that engages the cam. A motor and gear assembly control rotation of the actuation plate and cause the distal ends of the dampers to engage the cam to perform a brake actuation.

14 Claims, 2 Drawing Sheets

LININGLESS BRAKE ASSEMBLY WITH DAMPERS

BACKGROUND OF THE INVENTION

This invention relates to a liningless braking mechanism that utilizes mechanical/hydraulic damping to absorb energy.

Vehicle brake assemblies typically include brake linings that interact with either a brake drum or a brake disc to brake a vehicle. The brake linings are supported on plates and are controlled by actuators, which bring the linings into contact with the brake drum or disc utilizing frictional forces to stop or slow a vehicle.

These linings wear over time due to the frictional contact. For heavy duty braking applications, the linings wear out quickly and need to be replaced often. This is very expensive and results in significant vehicle down time.

Another disadvantage with brake linings is that as the linings wear, the brake becomes out of adjustment. Thus, the necessary brake pedal stroke length to actuate the brake will increase as the linings wear. To account for this, brake assemblies include slack adjusters that adjust the position of the brake linings to try to keep a constant distance between the surface of the linings and the brake drum or disc surface. These slack adjusters take up valuable packaging space and increase assembly time and cost.

Thus, it is desirable to provide a braking assembly that eliminates the need for brake linings and brake drums/discs and overcomes the above mentioned deficiencies.

SUMMARY OF THE INVENTION

This braking mechanism utilizes a unique concept for dissipating energy from a vehicle. This unique braking mechanism eliminates the need for brake drums and brake linings. A mechanical/hydraulic damping system is used to absorb energy during braking and can be actuated by conventional methods or with brake-by-wire actuation.

In a disclosed embodiment of this invention, the liningless braking mechanism is incorporated into an axle having a non-rotating axle member and a rotating axle member for rotation about an axis. A base plate is fixed to the non-rotating axle member and an actuation plate is mounted for selective rotation about the axis. A cam is mounted for rotation with the rotating axle member and a plurality of dampers are used to perform braking actuations. The dampers each include a mounting portion in contact with the actuation plate to move the dampers relative to the base plate and include a movable distal end for selectively engaging the cam. An actuator selectively rotates the actuation plate to engage the distal end against the cam to perform a brake actuation.

In a preferred embodiment, the actuation plate radially adjusts the distal ends relative to the cam to control braking force. The base plate is comprised of a circular disc having a plurality of radially extending orientation slots formed about the circumference and the actuation plate is comprised of a circular disc having a plurality of curved actuation slots formed about the circumference. The orientation slots restrict radial damper movement toward an axle center and the actuation slots determine the rate of damper actuation during braking.

In a further preferred embodiment, the cam includes a plurality of lobes formed about the circumference for engagement with the distal ends during braking. The actuator includes a motor and gear drive for selectively controlling rotation of the actuation plate about the axis to adjust the position of the distal ends relative to the cam.

These and other features of the present invention can be best understood from the following specification and drawings, the following of which is a brief description.

DETAILED DESCRIPTION OF A PREFERRED EMBODIMENT

Figure 1:
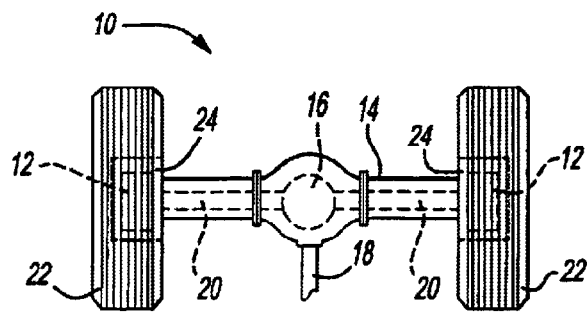
FIG. 1 is a schematic view of an axle assembly incorporating the subject invention.

An axle assembly 10 incorporating a unique brake mechanism 12 is shown in FIG. 1. This brake mechanism 12 is preferably used with on-highway heavy vehicles, which commonly utilize air brakes. The braking mechanism 12 utilizes a system of hydraulic/mechanical dampers for dissipating energy from a vehicle. These dampers remove energy from a vehicle during braking in a manner similar to that of shock absorbers.

By utilizing variable rate orifices within the damper, absorbed energy can be regulated with the degree of damper deployment with respect to a lobed member, which is similar to a rotating automotive camshaft. The variable rate can be achieved with the use of electronic valves in the dampers to control leak rate, or with the use of tapered orifice openings that are dependent on damper displacement. Another option for damper design is damper attachment to a common electronic orifice and reservoir. With the use of a central orifice and reservoir, the process is more conducive to increased damping control for smoother brake actuation. To allow for temperature extremes in different geographic locations, a temperature sensor is utilized to calibrate orifice opening size to provide consistent pedal feel for the drive independent of fluid viscosity.

An alternative system for damping would utilize variable rate springs as a damper for energy absorption. The variable rate spring allows for increased energy dissipation dependent on actual displacement. By combining mechanical and hydraulic methods for damping, an ideal combination is realized.

These systems will be discussed below in relation to FIGS. 1–4. The axle assembly 10 includes an axle housing 14 and a center differential 16 that receives driving input from a driveshaft 18. The differential 16 drives a pair of axle shafts 20 that drive wheels 22 mounted at opposite ends of the axle 10. The axle 10 includes a wheel end assembly 24 into which the brake mechanism 12 is incorporated.

Figure 2:
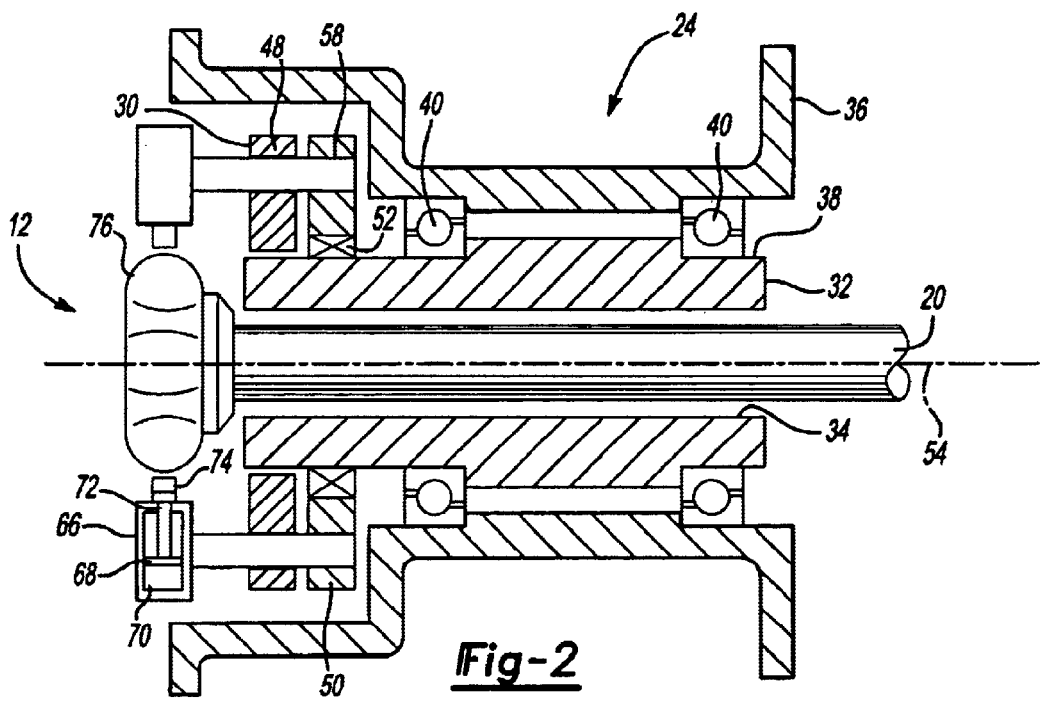
FIG. 2 is a cross-sectional view of a wheel end incorporating the subject invention.
Figure 3:
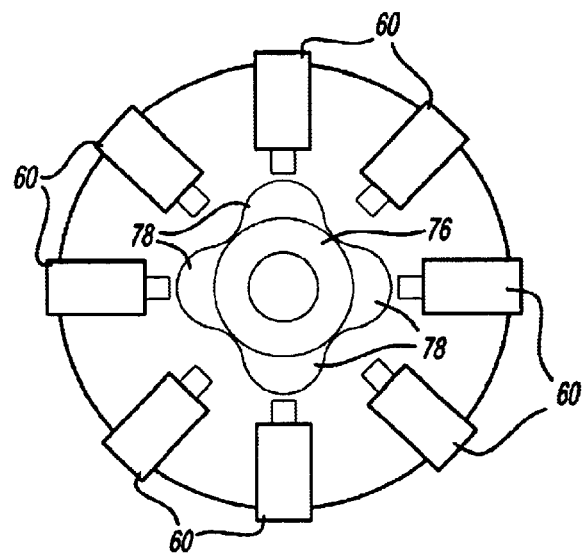
FIG. 3 is a schematic end view of the wheel end of FIG. 2.
Figure 4:
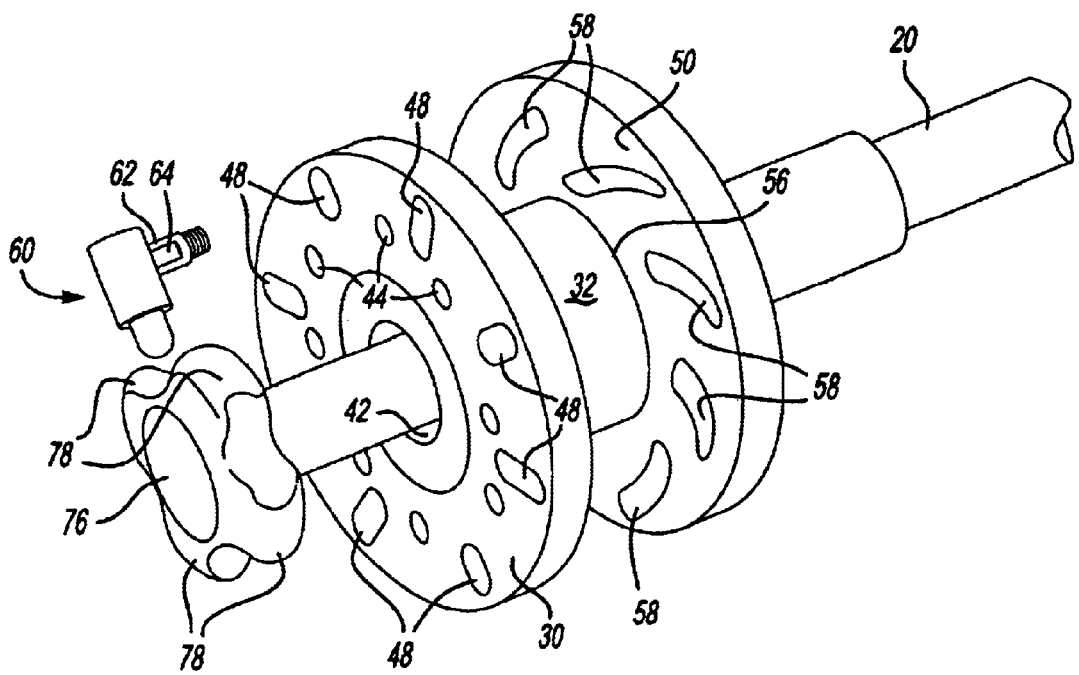
FIG. 4 is a perspective view of the subject invention.

A detailed cross-section of the wheel end assembly 24 is shown in FIG. 2. A base plate 30 is mounted to a non-rotating axle component such as a spindle 32 connected to the axle housing 14. The spindle 32 includes an interior bore 34 in which the axle shaft 20 rotates. A wheel hub 36 is rotatably supported on an exterior surface 38 of the spindle 32 with a plurality of bearings 40. Rims (not shown) are mounted to the wheel hub and tires are mounted to the rims.

The base plate 30 is formed as a circular disc with a central mounting hole 42 (see FIG. 4) that is received over the spindle 32. The base plate 30 includes a plurality of mounting holes 44 spaced about the inner diameter of the plate 30 for receiving a plurality of fasteners (not shown) for attaching the base plate 30 to a spindle flange or other non-rotating axle component. A plurality of orientation slots 48 extend radially outwardly from the central mounting hole 42. Preferably, eight (8) orientation slots 48 are formed within the base plate 30 and positioned equal distances from each other. However, more or less than eight (8) orientation slots 48 could be used.

An actuation plate 50 is mounted on a radial bearing 52 on the same non-rotating axle component as the base plate 30. The actuation plate 50 is mounted such that only rotational movement about an axis 54 defined by the axle shaft 20 is allowed. The radial bearing 52 allows the actuation plate 50 to rotate relative to the spindle 32 but prevents linear movement of the actuation plate 50 relative to the spindle 32. The actuation plate 50 includes a central mounting hole 56 received over the spindle 32 and a plurality of actuation slots 58. The actuation slots 58 are curved slots and correspond in number to the orientation slots 48. The actuation slots 58 are positioned such that one actuation slot 58 is partially overlaid with one orientation slot 48. The actuation slots 58 provide a limited amount of rotation of the actuation plate 50 relative to the base plate 30 to adjust braking force.

A plurality of dampers 60 are used to absorb energy during a braking interval. The number of dampers 60 corresponds to the number of orientation 48 and actuation 58 slots. Preferably, eight (8) dampers 60 are used (see FIG. 3), which are phased 45 degrees apart from each other to provide pulseless actuation. The dampers 60 each include a mounting portion 62 that is the form of a circular shaft member that extends outwardly at a right angle relative to the damper 60. The mounting portion 62 is extended through the orientation 48 and actuation 58 slots. The mounting portion 62 includes a flat keyway portion 64 that reacts against the slots 48, 58 to prevent rotation of the damper 60.

In one embodiment, the damper 60 operates like a piston and includes housing 66 that encloses a piston 68 slidably mounted with a chamber 70. The damper 60 includes a distal end 72 that supports a roller 74. The distal end 72 is moveable relative to the housing 66 to actuate the piston 68.

A cam 76 is mounted for rotation with the axle shaft. The cam includes a plurality of lobes 78 that engage the distal ends 72 of the dampers 60 to brake the vehicle. The cam 76 is mounted to one side of the base plate 30 and the actuation plate 50 is mounted on an opposite side of the base plate 30.

Figure 5:
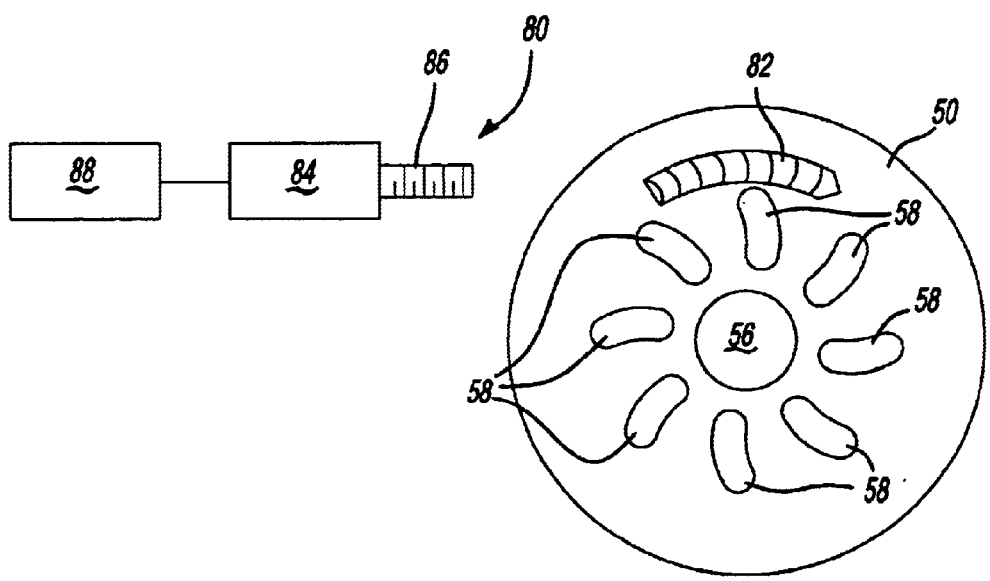
FIG. 5 is a schematic view of the actuating mechanism.

A brake actuator 80, see FIG. 5, rotates the actuation plate 50 to adjust the position of the dampers 60 to provide the required damping force to brake the vehicle. A plurality of gear teeth 82 are formed on one side of the actuation plate 50. The brake actuator 80 includes a motor 84 that drives a worm gear 86 that drivingly meshes with the gear teeth 82 on the actuation plate 50. The motor 84 rotates the actuation plate 50 to adjust the position of the damper 60 upward/outward in the slots 48, 58 to increase damper volume (decrease compression ratio) to absorb less energy for providing lighter braking intervals. The motor 84 rotates the actuation plate 50 to adjust the position of the damper 60 downward/inward in the slots 48, 58 to decrease volume (increase compression ratio) to absorb more energy for heavy braking. The motor 84 can be electrically connected to a microprocessor or other similar controller 88 to provide brake-by-wire adjustment.

The base plate 30 is fixed to an axle end for the purpose of preventing damper rotation during actuation. With the use of orientation slots 48, damper movement is restricted toward the center of the axle. Thus, the orientation slots 48 restrict radial damper movement toward the axis of rotation 54 and the actuation slots 58 determine the rate of damper actuation during braking.

The actuation plate 50 determines rate of damper actuation during braking due to actuation slot geometry. The radial bearing 52 is used to mount the actuation plate 50 on a wheel end, with linear displacement constrained. The electric motor 84 is then utilized with a conical worm gear 86 for brake actuation plate rotation to provide a truly brake by wire system. For use with a conventional air brake system, an air chamber could be utilized to provide the required brake actuation forces.

The damping mechanism will utilize a hydraulic or mechanical setup, which will resist upward movement of a piston during actuation; and input minimal energy to the vehicle during the downward cycle of the piston. The control method of the damping mechanism can be either mechanical or electro-hydraulic. In the case of a hydraulic damping mechanism, utilization of variable rate orifices in the damper can be used to vary the degree of energy absorption, which is dependent upon damper application with respect to a camshaft. The variable rate can also be achieved with the use of electronic valves in the dampers to control leak rate. Another option for damper design is to attach all the dampers to a common electronic orifice and reservoir with hydraulic lines. A temperature sensor can be used to calibrate orifice opening size to provide consistent pedal feel for the driven independent of fluid viscosity.

For the mechanical damper setup, a variable rate coil spring is utilized to vary energy absorption dependent upon degree of actuation. The dampers actuation end is similar to a roller lifter used in an internal combustion engine, which incorporates a roller bearing to lessen wear on the actuation camshaft and damper.

The cam 76 is preferably incorporated into the axle shaft 20 and rotates concurrently with the wheel end 24. With correct camshaft lobe phasing, seamless brake application and energy absorption is accomplished. The cam 76 is enclosed in a housing to allow for constant lubrication with the damper rollers, an oil bath or grease lubrication system will be utilized.

The use of dampers 60 eliminates the need for adjusters or replacement linings required by conventional drum and disc brakes. Additionally, the liningless brake mechanism will not have to be serviced as often as conventional brakes, which will reduce downtime and service costs. Vehicle operation is enhanced with the use of dampers including securing a vehicle for parking, full brake actuation with solenoid gate closing will prevent wheel end rotation due to piston lock-up. The advantage of the damper design for a parking brake system is that there is immediate disengagement available compared to current air brake systems that require system charge time before vehicle operation.

Although a preferred embodiment of this invention has been disclosed, it should be understood that a worker of ordinary skill in the art would recognize many modifications come within the scope of this invention. For that reason, the following claims should be studied to determine the true scope and content of this invention.

What is claimed is:

1. A vehicle brake assembly comprising:
   a base plate fixed to a non-rotating axle member and including a plurality of radially extending orientation slots;

an actuation plate mounted adjacent to said base plate for rotation with respect to said base plate about an axis, said actuation plate including a plurality of actuation slots with one of said actuation slots partially overlapping one of said orientation slots;

a cam having a plurality of cam-lobes formed about a circumference and mounted for rotation with a rotating axle member about said axis;

a plurality of dampers wherein each damper includes a mounting portion that extends through one of said orientation slots and said corresponding actuation slot and includes a movable distal end in selective engagement with said cam; and an actuator for selectively rotating said actuation plate to engage said distal ends against said cam to perform a brake actuation.

2. An assembly as recited in claim 1 wherein said actuator adjusts the position of said dampers within said orientation slots to vary the damping rate of said dampers.

3. An assembly as recited in claim 1 wherein said actuator includes a motor for selectively driving a gearing mechanism to rotate said actuation plate about said axis.

4. An assembly as recited in claim 3 wherein said actuation plate is a circular disc having a plurality of gear teeth formed on one side of said disc and wherein said gear assembly includes a worm gear driven by an output shaft of said motor, said worm gear in drive engagement with said gear teeth.

5. An assembly as recited in claim 1 including a radial bearing assembly for mounting said actuation plate to a wheel end component.

6. An assembly as recited in claim 5 wherein said radial bearing assembly prevents linear movement of said actuation plate along said axis.

7. An assembly as recited in claim 1 wherein said rotating axle member is an axle shaft.

8. An assembly as recited in claim 1 wherein said mounting portion of each of said dampers is formed as a radial shaft extending through said orientation and actuation slots and including a flat keyway that prevents rotation of said dampers relative to said base and actuation plates.

9. An assembly as recited in claim 8 wherein said actuation plate radially adjusts said distal ends with respect to said cam to control braking force.

10. An axle assembly having a liningless braking mechanism comprising:

a non-rotating axle member;

a rotating axle member for rotation about an axis relative to said non-rotating axle member;

a base plate fixed to said non-rotating axle member;

an actuation plate mounted for selective rotation about said axis;

a cam mounted for rotation with said rotating axle member about said axis;

a plurality of dampers each including a mounting portion in contact with said actuation plate to move said dampers relative to said base plate and each having a movable distal end for selectively engaging said cam; and an actuator far selectively rotating said actuation plate to engage said distal ends against said cam to perform a brake actuation.

11. An assembly as recited in claim 10 wherein said actuation plate radially adjusts said distal ends relative to said cam to control braking force.

12. An assembly as recited in claim 11 wherein said base plate is comprised of a circular disc having a plurality of radially extending orientation slots formed about a circumference, and said actuation plate is comprised of a circular disc having a plurality of curved actuation slots formed about a circumference wherein said orientation slots restrict radial damper movement toward an axle center and said actuation slots determine a rate of damper actuation during braking.

13. An assembly as recited in claim 12 wherein said cam includes a plurality of lobes formed about a circumference for engagement with said distal ends during braking.

14. An assembly as recited in claim 13 wherein said actuator includes a motor and gear drive for selectively controlling rotation of said actuation plate about said axis.

* * * * *

UNITED STATES PATENT AND TRADEMARK OFFICE
CERTIFICATE OF CORRECTION

PATENT NO.    : 6,834,748 B2
DATED         : December 28, 2004
INVENTOR(S)   : Baldwin It is certified that error appears in the above-identified patent and that said Letters Patent is hereby corrected as shown below:

<u>Column 6,</u>
Line 19, "far" should read as -- for --.

Signed and Sealed this

Fifteenth Day of March, 2005

JON W. DUDAS
*Director of the United States Patent and Trademark Office*